US012013587B2

(12) United States Patent
Sue

(10) Patent No.: US 12,013,587 B2
(45) Date of Patent: Jun. 18, 2024

(54) OPTICAL UNIT

(71) Applicant: NIDEC SANKYO CORPORATION, Nagano (JP)

(72) Inventor: Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 280 days.

(21) Appl. No.: 17/486,948

(22) Filed: Sep. 28, 2021

(65) Prior Publication Data

US 2022/0107479 A1   Apr. 7, 2022

(30) Foreign Application Priority Data

Oct. 2, 2020   (JP) ................. 2020-167694

(51) Int. Cl.
  *G02B 7/02*   (2021.01)
  *G02B 7/08*   (2021.01)
  *G02B 27/64*  (2006.01)
  *G03B 30/00*  (2021.01)
  *H02K 33/18*  (2006.01)

(52) U.S. Cl.
  CPC ............. *G02B 7/02* (2013.01); *G02B 7/08* (2013.01); *G02B 27/646* (2013.01)

(58) Field of Classification Search
  CPC .......... G02B 7/02; G02B 27/646; G02B 7/08; G03B 30/00; H02K 33/18
  See application file for complete search history.

(56) References Cited

U.S. PATENT DOCUMENTS

| 7,061,700 B2 * | 6/2006 | Honsho ............... G02B 7/08 |
| | | 359/699 |
| 9,116,361 B2 | 8/2015 | Minamisawa et al. |
| 9,891,407 B2 * | 2/2018 | Baek .................. G02B 7/10 |
| 10,983,362 B2 * | 4/2021 | Minamisawa ....... G02B 27/646 |

(Continued)

FOREIGN PATENT DOCUMENTS

| CN | 86105258  | 5/1987 |
| CN | 103052909 | 4/2013 |

(Continued)

OTHER PUBLICATIONS

"Office Action of China Counterpart Application", dated May 27, 2023, with English translation thereof, pp. 1-16.

(Continued)

*Primary Examiner* — Pinping Sun
*Assistant Examiner* — Muhammad Alawi Fadag
(74) *Attorney, Agent, or Firm* — JCIPRNET

(57) ABSTRACT

An optical unit includes a movable body, a fixed body surrounding the movable body, a turning support mechanism turnably supporting the movable body with respect to the fixed body, and a drive mechanism including a coil disposed on the movable body or the fixed body, and multiple magnets disposed on the other of the movable body and the fixed body at a position facing the coil. An end part in an optical axis direction of the coil is bent in a direction approaching a turning axis of the movable body, and the magnets are disposed side by side so that faces of the magnets facing the coil become approximately parallel to the coil when viewed in a direction of the turning axis in comparison with a case that the magnets are arranged along the optical axis direction.

4 Claims, 5 Drawing Sheets

(56) References Cited

U.S. PATENT DOCUMENTS

| | | |
|---|---|---|
| 11,442,287 B2 * | 9/2022 | Minamisawa ........ H04N 23/685 |
| 2005/0174657 A1 * | 8/2005 | Honsho .................... G02B 7/08 |
| | | 359/819 |
| 2017/0045753 A1 * | 2/2017 | Enta ..................... H04N 23/682 |
| 2021/0223663 A1 * | 7/2021 | Minamisawa ......... H04N 23/57 |
| 2021/0240000 A1 * | 8/2021 | Kasahara ................ G02B 7/02 |
| 2022/0107549 A1 * | 4/2022 | Hatano .................. H04N 23/57 |

FOREIGN PATENT DOCUMENTS

| | | | | |
|---|---|---|---|---|
| CN | 105099119 | | 11/2015 | |
| JP | 2016099503 | | 5/2016 | |
| JP | 2019033357 | A * | 2/2019 | ............ H01Q 1/246 |
| JP | 2019070865 | | 5/2019 | |
| JP | 2019070865 | A * | 5/2019 | |
| KR | 20160095906 | | 8/2016 | |
| WO | 2011034001 | | 3/2011 | |
| WO | 2019221021 | | 11/2019 | |
| WO | WO-2019221038 | A1 * | 11/2019 | ............ G03B 30/00 |

OTHER PUBLICATIONS

"Office Action of China Counterpart Application", dated Nov. 13, 2023, with English translation thereof, pp. 1-14.

\* cited by examiner

OPTICAL UNIT

CROSS REFERENCE TO RELATED APPLICATION

The present invention claims priority under 35 U.S.C. § 119 to Japanese Application No. 2020-167694 filed Oct. 2, 2020, and the entire content of which is incorporated herein by reference.

FIELD OF THE INVENTION

At least an embodiment of the present invention may relate to an optical unit.

BACKGROUND

Various optical units have been conventionally used. In these optical units, there is an optical unit in which a movable body having an optical module is turnably supported with respect to a fixed body. For example, in Japanese Patent Laid-Open No. 2016-99503 (Patent Literature 1) and Japanese Patent Laid-Open No. 2019-70865 (Patent Literature 2), optical units in which a movable body having an optical module is turnably supported with respect to a fixed body are disclosed, and the optical unit includes a drive mechanism having one coil whose end parts are bent in a direction approaching a turning axis and one magnet which is formed so that a distance to the coil does not widen.

In a common optical unit in which a movable body is turned with respect to a fixed body by a drive mechanism having a coil and a magnet, when a turning range becomes large, a distance between the coil and the magnet increases and widens especially at positions of end parts, and drive efficiency of turning may be deteriorated. In order to prevent this problem, like the optical units of Patent Literature 1 and Patent Literature 2, in an optical unit including a drive mechanism having one coil whose end parts are respectively bent in a direction approaching a turning axis and one magnet, an increase of a distance between the coil and the magnet when a turning range becomes large can be suppressed and thus, deterioration of drive efficiency of turning such as increase of electric power consumption can be suppressed. However, it may be difficult to form a magnet so that a distance to a bent coil is not increased with the use of one magnet and, when a turning range becomes large, there is a possibility that an increase of a distance between the coil and the magnet cannot be sufficiently suppressed.

SUMMARY

At least an embodiment of the present invention may advantageously provide an optical unit in which a movable body having an optical module is turnably supported with respect to a fixed body and drive efficiency of turning is not deteriorated even when a turning range is large.

According to at least an embodiment of the present invention, there may be provided an optical unit including a movable body having an optical module, a fixed body which surrounds the movable body in a peripheral direction intersecting an optical axis direction of the optical module, a turning support mechanism which turnably supports the movable body with respect to the fixed body with a direction intersecting the optical axis direction as a turning axis, and a drive mechanism including a coil which is disposed on one of the movable body and the fixed body, and a plurality of magnets which are disposed on the other of the movable body and the fixed body at a position facing the coil. An end part in the optical axis direction of the coil is bent in a direction approaching the turning axis, and the plurality of the magnets are disposed side by side so that faces of the plurality of the magnets facing the coil become approximately parallel to the coil when viewed in a direction of the turning axis in comparison with a case that the plurality of the magnets is arranged along the optical axis direction.

According to at least an embodiment of the present invention, an optical unit includes a coil whose end part in an optical axis direction is bent in a direction approaching the turning axis, and a plurality of magnets disposed side by side so that faces of the plurality of the magnets facing the coil become approximately parallel to the coil when viewed in a direction of the turning axis in comparison with a case that the plurality of the magnets are arranged along the optical axis direction. Therefore, the magnet is easily formed and thus, the magnets can be effectively disposed so as not to increase a distance between the bent coil and the magnets and, even when a turning range of turning of the movable body with respect to the fixed body is large, drive efficiency of turning is not deteriorated.

In the optical unit in accordance with at least an embodiment of the present invention, the plurality of the magnets is disposed side by side in a state having a step with respect to an adjacent magnet. According to this structure, each of the magnets is easily formed and the magnets can be effectively disposed so as not to increase a distance between the bent coil and the magnets.

In the optical unit in accordance with at least an embodiment of the present invention, regions on both end part sides in the optical axis direction of the coil form effective sides extended in the direction of the turning axis. According to this structure, drive efficiency of the coil can be enhanced.

In the optical unit in accordance with at least an embodiment of the present invention, in the drive mechanism, the coil and the magnets are disposed so that the effective side and at least one of the magnets face each other, even in a case that the movable body is turned with respect to the fixed body in a maximum turning range by the turning support mechanism. According to this structure, even in a case that the movable body is turned with respect to the fixed body in a maximum turning range by the turning support mechanism, a drive force can be effectively applied and drive efficiency can be enhanced.

In the optical unit in accordance with at least an embodiment of the present invention, the coil is bent at a position different from the effective side. In a case that the coil is bent in an effective side, it is difficult that the coil and the magnet face in parallel to each other in the bent region. However, when the coil is bent at a position different from an effective side, the coil and the magnet are capable of easily facing in parallel to each other and thus, drive efficiency can be enhanced.

In the optical unit in accordance with at least an embodiment of the present invention, the coil is bent three times or more, and the number of the magnets is three or more. When the number of bending times of the coil is small, in a case that a turning range is large, a distance between the coil and the magnet may be easily increased and widened. However, according to the structure described above, even in a case that a turning range becomes large, a distance between the coil and the magnet can be reduced and drive efficiency can be enhanced.

The optical unit in accordance with the present invention in which a movable body having an optical module is turnably supported with respect to a fixed body is structured so that drive efficiency of turning is not deteriorated even when a turning range is large.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Preferred embodiments of the present invention will be described below with reference to the accompanying drawings. The same structures in respective embodiments are indicated with the same reference signs and described only in a first embodiment, and descriptions of the structures are omitted in the following embodiments. In respective drawings, the "X"-axis, the "Y"-axis and the "Z"-axis are directions perpendicular to each other. Figures viewed to a "+X" direction side and a "−X" direction side are referred to as side views, a figure viewed to a "−Y" direction side is referred to as a front view, a figure viewed to a "+Y" direction side is referred to as a rear view, a figure viewed to a "−Z" direction side is referred to as a plan view, and a figure viewed to a "+Z" direction side is referred to as a bottom view. Further, the "X"-axis direction corresponds to a yawing axis direction, the "Y"-axis direction corresponds to a pitching axis direction, and the "Z"-axis direction corresponds to an optical axis direction and corresponds to a rolling axis direction.

Figure 1:
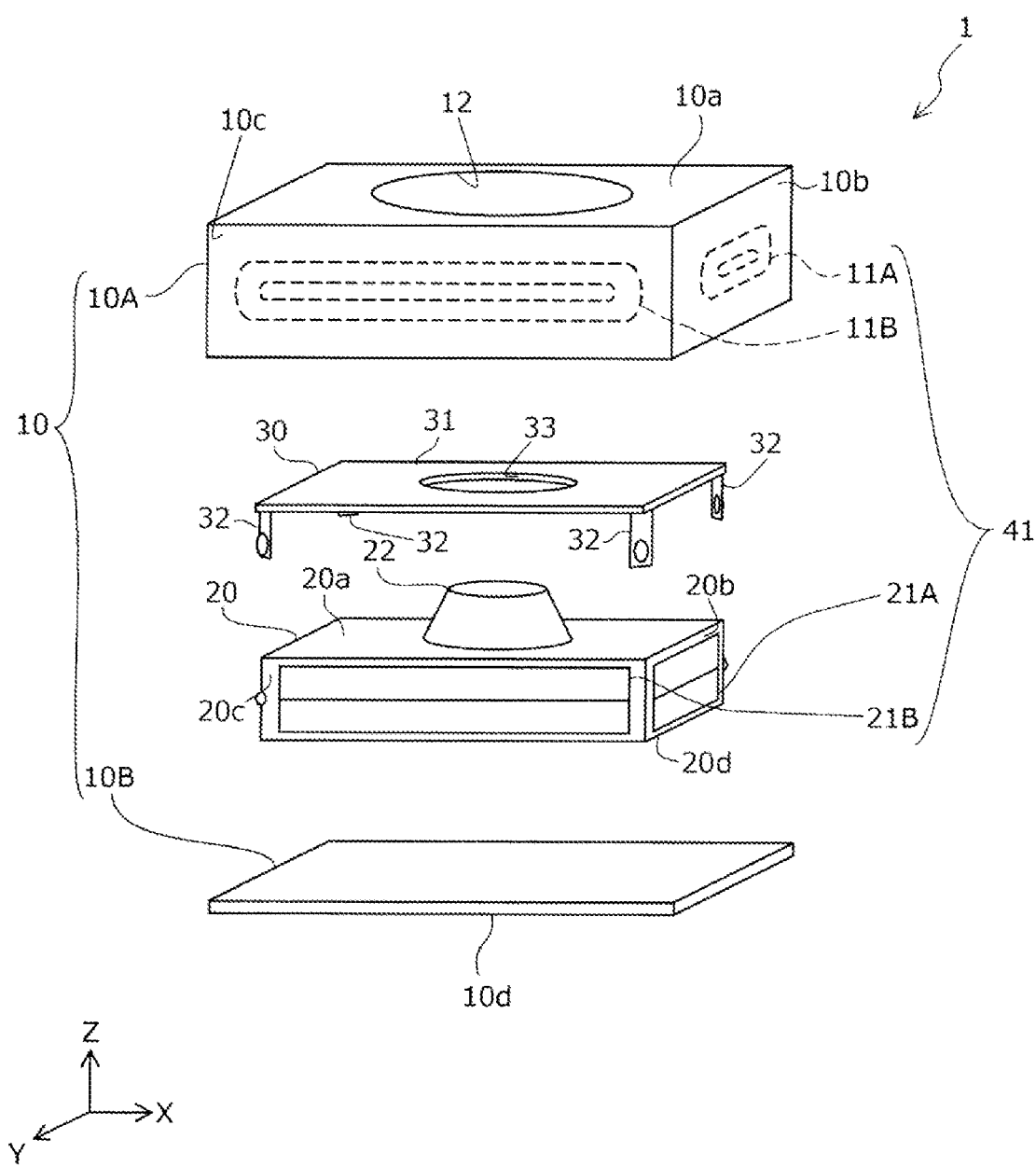
FIG. 1 is an exploded perspective view showing an optical unit in accordance with a first embodiment of the present invention.
Figure 2:
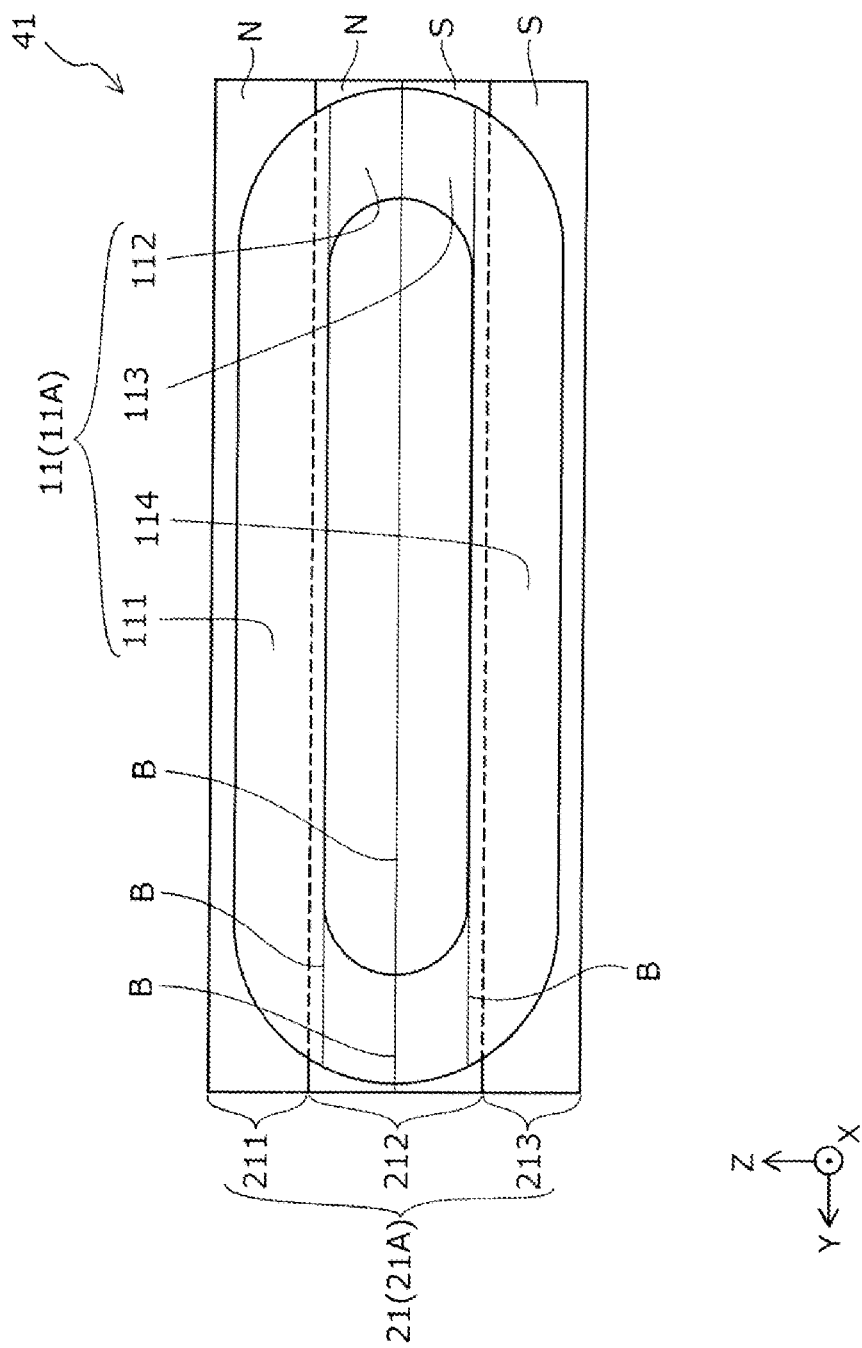
FIG. 2 is a side view showing a drive mechanism of the optical unit in accordance with the first embodiment of the present invention.
Figure 3:
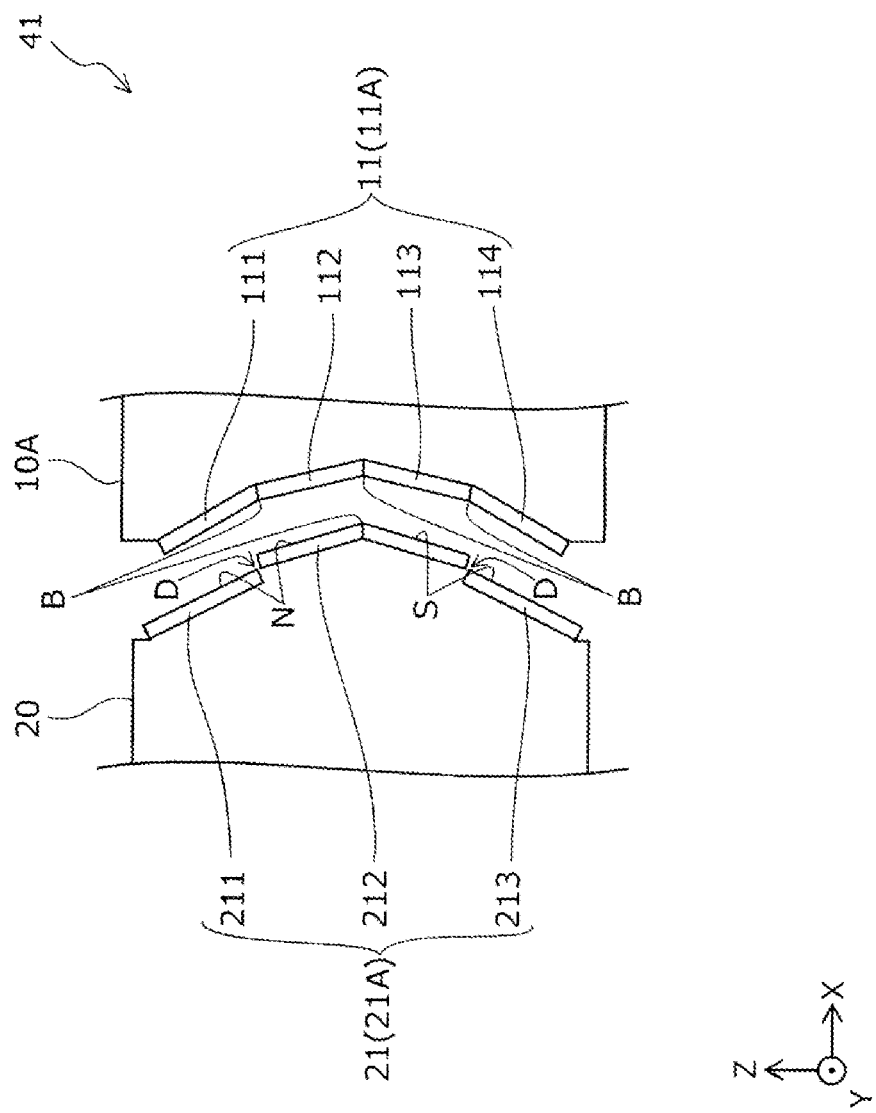
FIG. 3 is a front view showing the drive mechanism of the optical unit in accordance with the first embodiment of the present invention.

First Embodiment (FIG. 1 Through FIG. 3)

First, as an optical unit in accordance with the present invention, an optical unit 1 in a first embodiment will be described below with reference to FIG. 1 through FIG. 3. As described in detail below, an optical unit 1 in this embodiment includes a movable body 20 having an optical module 22, a fixed body 10 surrounding the movable body 20 in a peripheral direction intersecting an optical axis direction ("Z"-axis direction) of the optical module 22, a gimbal mechanism 30 as a turning support mechanism which turnably supports the movable body 20 with respect to the fixed body 10 with a direction ("X"-axis direction and "Y"-axis direction) intersecting the optical axis direction as a turning axis, and a drive mechanism 41 having a coil 11 (coils 11A and 11B) disposed on the fixed body 10 and a magnet 21 (magnets 21A and 21B) disposed on the movable body 20 at a position facing the coil 11.

<Entire Structure of Optical Unit>

First, an entire structure of the optical unit 1 in this embodiment will be described below with reference to FIG. 1. The optical unit 1 in this embodiment can be preferably used in a camera or a smart phone. The optical unit 1 in this embodiment is capable of being structured compactly and thus, a camera and a smart phone can be structured compactly. However, the optical unit 1 in this embodiment is not limited to a camera and a smart phone and is capable of being used in various devices without especially limiting a use.

As shown in FIG. 1, the optical unit 1 in this embodiment includes the movable body 20 having the optical module 22 in which a lens and the like are provided. Further, the optical unit 1 includes the fixed body 10 having a case part 10A, which surrounds the movable body 20 in a peripheral direction intersecting the optical axis direction ("Z"-axis direction) of the optical module 22, and a bottom part 10B which is capable of covering the case part 10A from the "−Z" direction side in a state that the movable body 20 is accommodated in the case part 10A. Further, the optical unit 1 includes the gimbal mechanism 30 which is provided with a gimbal frame part 31 having a spring property between the movable body 20 and the fixed body 10 so that the movable body 20 is turnably supported with respect to the fixed body 10 with the "X"-axis direction and the "Y"-axis direction as turning axes. In addition, the optical unit 1 includes the drive mechanism 41 structured to turn the movable body 20 with respect to the fixed body 10.

<Movable Body>

The movable body 20 is formed in a substantially rectangular parallelepiped shape. The optical module 22 is held in an inside of the movable body 20 by an upper face part 20a, a lower face part 20d, side face parts 20b on both sides in the "X"-axis direction, and side face parts 20c on both sides in the "Y"-axis direction, and the optical module 22 is disposed in a state that a lens is protruded from the upper face part 20a which is a face on the "+Z" direction of the movable body 20. Further, the side face parts 20b on both sides in the "X"-axis direction of the movable body 20 are provided with magnets 21A which structure the drive mechanism 41. Further, the side face parts 10c on both sides in the "Y"-axis direction of the movable body 20 are provided with magnets 21B structuring the drive mechanism 41. In this embodiment, the magnet 21A and the magnet 21B are similarly structured to each other, and their detailed structures will be described in explanation of the drive mechanism 41 described below.

<Fixed Body>

The fixed body 10 is formed in a substantially rectangular parallelepiped shape, and the case part 10A structures an upper face part 10a, side face parts 10b on both sides in the "X"-axis direction and side face parts 10c on both sides in the "Y"-axis direction, and the bottom part 10B structures a lower face part 10d. The fixed body 10 surrounds the movable body 20 by the upper face part 10a and the lower face part 10d in the "Z"-axis direction, surrounds the movable body 20 by the side face parts 10b in the "X"-axis direction, and surrounds the movable body 20 by the side face parts 10c in the "Y"-axis direction. In this embodiment, the upper face part 10a which is a face on the "+Z" direction side of the fixed body 10 is provided with a hole part 12 through which the lens of the optical module 22 is passed.

Further, inner side faces of the side face parts 10b on both sides in the "X"-axis direction of the fixed body 10 are provided with coils 11A which structure the drive mechanism 41. Further, inner side faces of the side face parts 10c on both sides in the "Y"-axis direction of the fixed body 10 are provided with coils 11B which structure the drive mechanism 41. The coil 11A is disposed at a position facing the magnet 21A and the coil 11B is disposed at a position facing the magnet 21B. In this embodiment, the coil 11A and the coil 11B are similarly structured to each other, and their detailed structures will be described below in explanation of the drive mechanism 41 together with explanation of the magnet 21A and the magnet 21B.

<Gimbal Mechanism>

The gimbal mechanism 30 includes the gimbal frame part 31 which is provided with a circular hole part 33 for passing the optical module 22 and whose outer shape is rectangular, and connection parts 32 which connect the movable body 20 with the fixed body 10. The connection part 32 is formed at four corners of the rectangular gimbal frame part 31, and two connection parts 32 on a diagonal line are swingably connected with the movable body 20 and two connection parts 32 on the other diagonal line are swingably connected with the fixed body 10. In this embodiment, as the gimbal mechanism 30, a common gimbal mechanism which has been conventionally used in an optical unit may be used without especially limited.

<Drive Mechanism>

Next, the drive mechanism 41 which is a principal part of the optical unit 1 in this embodiment will be described below with reference to FIGS. 2 and 3 in addition to FIG. 1. FIGS. 2 and 3 are views showing the drive mechanism 41 (pitching axis swing mechanism) structured of the coil 11A of the coil 11 and the magnet 21A of the magnet 21. However, as described above, the coil 11A and the coil 11B are similarly structured to each other, and the magnet 21A and the magnet 21B are similarly structured to each other. Therefore, the following description may be considered as explanation of the drive mechanism 41 (yawing axis swing mechanism) which is structured of the coil 11B and the magnet 21B when the "X"-axis direction is exchanged with the "Y"-axis direction.

As shown in FIG. 1, the drive mechanism 41 includes a pitching axis swing mechanism structured of the coil 11A and the magnet 21A and a yawing axis swing mechanism structured of the coil 11B and the magnet 21B. However, the drive mechanism 41 is not limited to this structure, and only one of the pitching axis swing mechanism and the yawing axis swing mechanism may be provided in the drive mechanism 41. Further, the drive mechanism 41 in this embodiment is structured so as to have two pitching axis swing mechanisms (two pairs of the coil 11A and the magnet 21A) and two yawing axis swing mechanisms (two pairs of the coil 11B and the magnet 21B). However, it may be structured that one or three or more pitching axis swing mechanisms are provided and that one or three or more yawing axis swing mechanisms are provided. In addition, the drive mechanism 41 in this embodiment is structured so that the coil 11 is provided in the fixed body 10 and the magnet 21 is provided in the movable body 20, but it may be structured that the coil 11 is provided in the movable body 20 and the magnet 21 is provided in the fixed body 10.

<Magnet>

As shown in FIGS. 2 and 3, the magnet 21A is structured of a flat plate-shaped magnet 211, a plate-shaped magnet 212 which is bent at a bent part "B" to an outer side in the "X"-axis direction, and a flat plate-shaped magnet 213 in this order from the "+Z" direction side. Further, as shown in FIG. 3, both of the flat plate-shaped magnet 211 and the flat plate-shaped magnet 213 are disposed so that their end part sides in the "Z"-axis direction are located on an inner side in the "X"-axis direction. In other words, as shown in FIG. 3, the respective magnets of the magnet 21A are provided in an arrangement so as to become a circular arc shape when viewed in the "Y"-axis direction.

In this embodiment, the magnet 211 is structured so that a face of a side facing the coil 11A (outer side in the "X"-axis direction) is an "N"-pole. Further, in the magnet 212, a region on the "+Z" direction side with respect to the bent part "B" is structured so that a face of a side facing the coil 11A is an "N"-pole, and a region on the "−Z" direction side with respect to the bent part "B" is structured so that a face of a side facing the coil 11A is an "S"-pole. In addition, the magnet 213 is structured so that a face of a side facing the coil 11A is an "S"-pole. In other words, in the magnet 21A, a half region on the "+Z" direction side in the "Z"-axis direction is structured so that a face of a side facing the coil 11A is an "N"-pole, and a half region on the "−Z" direction side in the "Z"-axis direction is structured so that a face of a side facing the coil 11A is an "S"-pole.

<Coil>

As shown in FIGS. 2 and 3, the coil 11A is structured of an effective side 111 extended along the "Y"-axis direction, ineffective sides 112 and 113, and an effective side 114 extended along the "Y"-axis direction in this order from the "+Z" direction side. Further, as shown in FIG. 3, the coil 11A is bent at a bent part "B" so that a center in the "X"-axis direction of an ineffective side is protruded to an outer side in the "X"-axis direction and thereby, the coil 11A is divided into the ineffective side 112 and the ineffective side 113. Further, the coil 11A is bent at a bent part "B" so that a portion between the effective side 111 and the ineffective side 112 is protruded to an outer side in the "X"-axis direction and is bent at a bent part "B" so that a portion between the ineffective side 113 and the effective side 114 is protruded to an outer side in the "X"-axis direction.

As described above, the coil 11A is bent at three bent parts "B" so as to be convex to an outer side in the "X"-axis direction and thus, similarly to the magnet 211, the coil 11A is provided in an arrangement so as to form a circular arc shape when viewed in the "Y"-axis direction. In this embodiment, a turning axis of the pitching axis swing mechanism structured of the coil 11A and the magnet 21A is located on a center side of the movable body 20 in the "X"-axis direction ("−X" direction side in FIG. 3) and thus, it may be expressed that end parts in the "Z"-axis direction of the coil 11A are bent in a direction approaching the turning axis. In a state before the drive mechanism 41 is driven, the effective side 111 faces the magnet 211, the ineffective side 112 faces a region of an "N"-pole of the magnet 212, the ineffective side 113 faces a region of an "S"-pole of the magnet 212, and the effective side 114 faces the magnet 213. As described above, both of the coil 11A and the magnet 21A are provided in an arrangement so as to form a circular arc shape when viewed in the "Y"-axis direction and thus, even when the movable body 20 is turned with respect to the fixed body 10, a distance between the coil 11A and the magnet 21A can be restrained from being widened.

As described above, in the optical unit 1 in this embodiment, the coil 11A is bent in a direction so that end parts in the optical axis direction ("Z"-axis direction) approach the turning axis. Further, a plurality of the magnets 211, 212 and 213 are, similarly to the coil 11A, provided in an arrangement so as to form a circular arc shape when viewed in the "Y"-axis direction. Expressed in another way, a plurality of the magnets 211, 212 and 213 is disposed so as to be arranged that faces facing the coil 11A become substantially parallel to the coil 11A (so that a distance between the coil 11 and the magnet 21 becomes close to a constant distance) when viewed in the turning axis direction ("Y"-axis direction in FIG. 3) instead of arranging along the optical axis direction (straight in the "Z"-axis direction).

A plurality of the magnets 211, 212 and 213 in the optical unit 1 in this embodiment is simple in structure and is easily formed. Further, the respective magnets are effectively disposed by using these magnets 211, 212 and 213 which are easily formed so that a distance with respect to the bent coil 11A does not increase or become wide as described above. Therefore, the optical unit 1 in this embodiment is structured so that, even when a turning range of turning of the movable body 20 with respect to the fixed body 10 is large, drive efficiency of the turning is not deteriorated. Further, in a case that the magnet 21 and the coil 11 are provided in an arrangement so as to form a circular arc shape when viewed in the "Y"-axis direction, in comparison with a case that the magnet 21 and the coil 11 having the same size are disposed straight along the optical axis direction, the optical unit 1 can be suppressed from becoming large in the "Z"-axis direction.

In this embodiment, both of the coil 11A and the magnet 21A are disposed substantially along a circular arc shape with the turning axis as a center. However, the coil 11 and the magnet 21 may be disposed approximately along a circular arc shape with the turning axis as a center. In a case that end parts in the optical axis direction of the coil 11 is bent in a direction approaching a turning axis, and faces of a plurality of the magnets 21 facing the coil 11 are disposed so as to be arranged approximately parallel to the coil 11 with respect to a case that magnets are arranged straight along an optical axis direction when viewed in the turning axis direction, even in a case that a distance between the coil 11 and the magnet 21 is not substantially constant, the case is included in the present invention.

In this embodiment, as shown in FIG. 3, in the optical unit 1 in this embodiment, the magnet 211 and the magnet 212, and the magnet 212 and the magnet 213 are disposed side by side in a state having a step "D" with respect to the adjacent magnet. According to this structure, each of the magnets 211, 212 and 213 is structured so as to be easily formed and the magnets can be effectively disposed so as not to increase and widen a distance between the bent coil 11A and the magnets.

Further, as shown in FIG. 2, in the optical unit 1 in this embodiment, the coil 11A is not formed in a perfect circular shape or an elliptical shape which is formed of only a portion of a circular arc shape, but the coil 11A is formed in a shape having circular arc portions and both end portions extended in a straight line shape in the "Z"-axis direction (corresponding to the effective sides 111 and 114). The both end portions extended in a straight line shape are arranged so that the effective side 111 faces only an "N"-pole of the magnet 21A and that the effective side 114 faces only an "S"-pole. Expressed in another way, the coil 11A is formed so that regions on both end part sides in the optical axis direction ("Z"-axis direction) are extended to the turning axis direction ("Y"-axis direction) to form the effective sides 111 and 114. According to this structure, drive efficiency of the coil 11A can be enhanced.

In the optical unit 1 in this embodiment, as shown in FIGS. 2 and 3, in the optical axis direction ("Z"-axis direction) substantially corresponding to a circular arc-shaped direction as a direction that the coil 11 and the magnet 21 are disposed, the magnet 21A is disposed so as to protrude from the coil 11A. According to this arrangement, in the drive mechanism 41 in this embodiment, even in a case that the movable body 20 is turned with respect to the fixed body 10 in a maximum turning range by the gimbal mechanism 30, the coil 11A and the magnet 21A are arranged so that the effective sides 111 and 114 and at least one of the magnet 21A face each other. The optical unit 1 in this embodiment is structured as described above and thus, even in a case that the movable body 20 is turned with respect to the fixed body 10 in a maximum turning range by the gimbal mechanism 30, a drive force can be effectively applied and drive efficiency is enhanced.

Further, as described above, in the optical unit 1 in this embodiment, the coil 11A is provided with the bent part "B" at positions between the effective side and the ineffective side and in the ineffective side instead of providing the bent part "B" in the effective sides 111 and 114. As described above, it is preferable that the coil 11 is structured to be bent at a position which is different from the effective side (in an ineffective side or in a boundary portion between an effective side and an ineffective side). In a case that the coil 11 is bent in an effective side, the magnet 21 is, for example, required to be bent so as to correspond to the bent region and thus, it is difficult that the coil 11 and the magnet 21 face in parallel to each other in the bent region. However, when the coil 11 is bent at a position different from an effective side, the coil 11 and the magnet 21 are capable of easily facing in parallel to each other and thus, drive efficiency can be enhanced.

Further, as described above, in the optical unit 1 in this embodiment, the coil 11A is bent three times and the number of the magnet 21A is three. As described above, it is preferable that the coil 11 is bent three times or more and the number of the magnet 21 is three or more. When the number of bending times of the coil 11 is small, in a case that a turning range is large, a distance between the coil 11 and the magnet 21 may be easily increased and widened. However, according to the structure described above, even in a case that a turning range becomes large, a distance between the coil 11 and the magnet 21 can be reduced and drive efficiency can be enhanced.

Figure 4:
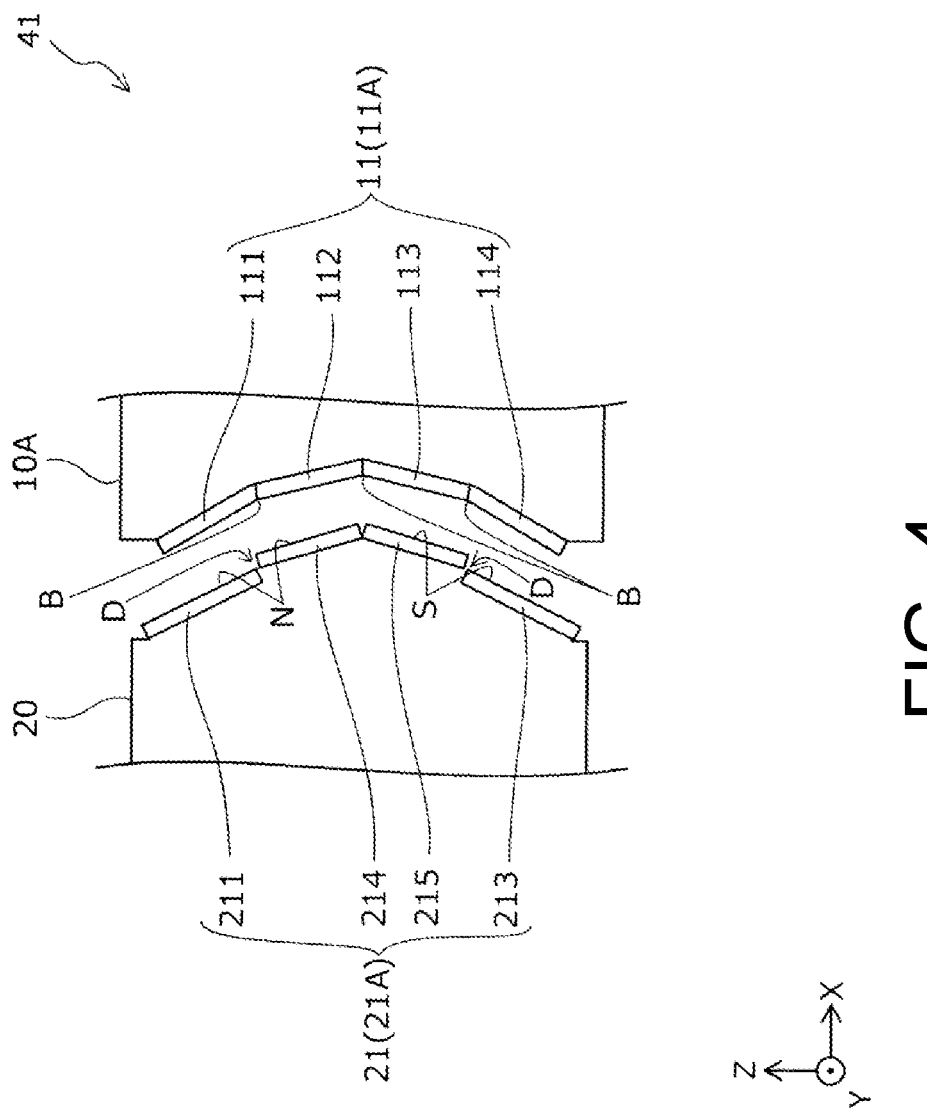
FIG. 4 is a front view showing a drive mechanism of an optical unit in accordance with a second embodiment of the present invention.

Second Embodiment (FIG. 4)

Next, an optical unit in a second embodiment will be described below with reference to FIG. 4. FIG. 4 is a front view showing a drive mechanism 41 of an optical unit in accordance with a second embodiment of the present invention and is a view corresponding to FIG. 3 in the optical unit 1 in the first embodiment. Structure members common to the first embodiment are indicated with the same reference signs and their detailed descriptions are omitted. The optical unit in the second embodiment is similarly structured to the optical unit 1 in the first embodiment except a structure of a portion described below. Therefore, the optical unit in the second embodiment is provided with technical features similar to the optical unit 1 in the first embodiment except a portion which will be described below.

As shown in FIG. 3, in the optical unit 1 in the first embodiment, the magnet (magnet 212) disposed between the magnet 211 and the magnet 213 is structured of one magnet. On the other hand, as shown in FIG. 4, in an optical unit in the second embodiment, a magnet disposed between the magnet 211 and the magnet 213 is structured of two flat plate-shaped magnets 214 and 215. In the optical unit in this embodiment, the drive mechanism 41 is structured by using only flat plate-shaped magnets and thus, it can be especially simply structured.

Figure 5:
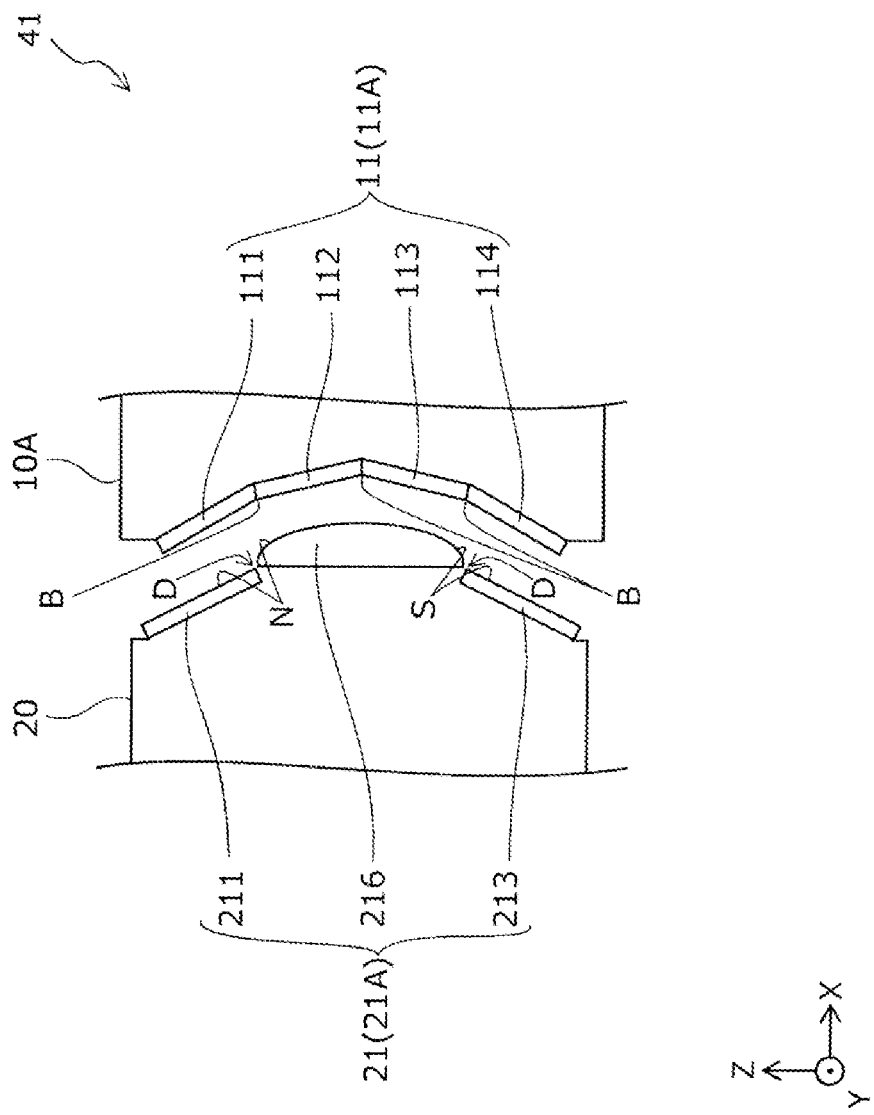
FIG. 5 is a front view showing a drive mechanism of an optical unit in accordance with a third embodiment of the present invention.

Third Embodiment (FIG. 5)

Next, an optical unit in a third embodiment will be described below with reference to FIG. 5. FIG. 5 is a front view showing a drive mechanism 41 of an optical unit in accordance with a third embodiment of the present invention and is a view corresponding to FIG. 3 in the optical unit 1 in the first embodiment. Structure members common to the first embodiment and the second embodiment are indicated with the same reference signs and their detailed descriptions are omitted. The optical unit in the third embodiment is similarly structured to the optical unit 1 in the first embodiment except a structure of a portion described below. Therefore, the optical unit in the third embodiment is provided with technical features similar to the optical unit 1 in the first embodiment except a portion which will be described below.

As shown in FIG. 3, in the optical unit 1 in the first embodiment, the magnet (magnet 212) disposed between the magnet 211 and the magnet 213 is structured of a magnet having the bent part "B". On the other hand, as shown in FIG. 5, in an optical unit in this embodiment, a magnet disposed between the magnet 211 and the magnet 213 is structured of a magnet 216 having a curved surface approximately along the ineffective sides 112 and 113 of the coil 11. In other words, shapes of a plurality of the magnets 21 are not especially limited.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit comprising:
   a movable body, having an optical module;
   a fixed body, configured to surround the movable body in a peripheral direction intersecting an optical axis direction of the optical module;
   a turning support mechanism, configured to turnably support the movable body with respect to the fixed body with a direction intersecting the optical axis direction as a turning axis, wherein the turning support mechanism is a gimbal mechanism including: a gimbal frame part provided with a circular hole for passing the optical module, and a connection part connecting the movable body with the fixed body; and
   a drive mechanism comprising:
      a coil, being disposed on one of the movable body and the fixed body; and
      a plurality of magnets, being disposed on the other of the movable body and the fixed body at a position facing the coil;
   wherein an end part in the optical axis direction of the coil is bent in a direction approaching the turning axis; and
   wherein the plurality of the magnets is disposed side by side so that faces of the plurality of the magnets facing the coil become approximately parallel to the coil when viewed in a direction of the turning axis in comparison with a case that the plurality of the magnets is arranged along the optical axis direction;
   wherein
   regions on both end part sides of the coil in the optical axis direction form two effective sides extended in the direction of the turning axis,
   regions between the both end part sides of the coil in the optical axis direction form two ineffective sides;
   the plurality of the magnets is disposed side by side in a state having a step with respect to an adjacent magnet,
   the magnet facing one of the two effective sides and the adjacent magnet facing one of the two ineffective sides are spaced apart from each other with a distance in the direction of the turning axis to be as the step,
   the magnet facing another of the two effective sides and the adjacent magnet facing another of the two ineffective sides are spaced apart from each other with a distance in the direction of the turning axis to be as the step.

2. The optical unit according to claim 1, wherein in the drive mechanism, the coil and the magnets are disposed so that one of the two effective sides and at least one of the magnets face each other, even in a case that the movable body is turned with respect to the fixed body in a maximum turning range by the turning support mechanism.

3. The optical unit according to claim 1, wherein the coil is bent at positions different from the two effective sides.

4. The optical unit according to claim 1, wherein the coil is bent three times or more, and a number of the magnets is three or more.

* * * * *